United States Patent
Adams et al.

(10) Patent No.: US 6,897,254 B2
(45) Date of Patent: May 24, 2005

(54) STABILIZED HALOGEN-CONTAINING POLYMER COMPOSITION

(75) Inventors: Paul Brian Adams, Hamilton, OH (US); Gene Kelly Norris, West Chester, OH (US)

(73) Assignee: Rohm and Haas Company, Philadelphia, PA (US)

( * ) Notice: Subject to any disclaimer, the term of this patent is extended or adjusted under 35 U.S.C. 154(b) by 65 days.

(21) Appl. No.: 10/307,807

(22) Filed: Dec. 2, 2002

(65) Prior Publication Data

US 2003/0158311 A1 Aug. 21, 2003

Related U.S. Application Data

(60) Provisional application No. 60/338,433, filed on Dec. 6, 2001.

(51) Int. Cl.$^7$ .............................. C08K 5/36; C08K 5/37
(52) U.S. Cl. ........................ 524/392; 524/94; 524/110; 524/393; 524/399; 524/434; 524/569; 524/330; 252/397; 252/400.52; 252/404; 252/405; 252/406; 252/407
(58) Field of Search ........................ 524/94, 110, 330, 524/392–393, 399, 434, 569, 292; 252/397, 400.52, 404–407

(56) References Cited

U.S. PATENT DOCUMENTS

| | | | |
|---|---|---|---|
| 2,985,617 A | | 5/1961 | Salyer et al. |
| 3,078,290 A | | 2/1963 | Hechenbleikner |
| 3,503,924 A | | 3/1970 | Pollock et al. |
| 3,507,827 A | | 4/1970 | Pollock et al. |
| 3,943,081 A | | 3/1976 | Brook |
| 4,178,282 A | | 12/1979 | Bae |
| 4,360,619 A | | 11/1982 | Kugele et al. |
| 4,751,261 A | | 6/1988 | Miyata et al. |
| 4,782,170 A | | 11/1988 | Bae et al. |
| 5,938,977 A | | 8/1999 | Rosenthal et al. |
| 6,232,380 B1 | * | 5/2001 | Conroy et al. ............... 524/291 |
| 6,326,518 B1 | | 12/2001 | Duvall et al. |
| 6,528,566 B2 | * | 3/2003 | Duvall et al. ............... 524/392 |
| 6,537,466 B1 | | 3/2003 | Duvall et al. |
| 6,548,707 B1 | | 4/2003 | Duvall et al. |
| 6,559,214 B1 | | 5/2003 | Duvall et al. |
| 6,573,318 B2 | | 6/2003 | Duvall et al. |
| 6,610,218 B1 | | 8/2003 | Duvall et al. |
| 6,706,792 B2 | * | 3/2004 | Duvall et al. ............... 524/392 |
| 6,743,840 B1 | * | 6/2004 | Duvall et al. ............... 524/110 |
| 2002/0091179 A1 | | 7/2002 | Norris |
| 2002/0103277 A1 | * | 8/2002 | Duvall ........................ 524/110 |
| 2003/0227006 A1 | | 12/2003 | Adams et al. |

FOREIGN PATENT DOCUMENTS

| | | |
|---|---|---|
| AU | A-48232/96 | 10/1996 |
| DE | 3021112 | 12/1981 |
| DE | 19741778 | 3/1998 |
| EP | 0070092 | 1/1983 |
| EP | 0224679 | 6/1987 |
| EP | 0945484 | 9/1999 |
| EP | 0945485 | 9/1999 |
| EP | 0987295 | 3/2000 |
| EP | 0742259 | 10/2000 |
| EP | 1055704 | 11/2000 |
| EP | 1201706 | 2/2002 |
| GB | 1248531 | 10/1971 |

OTHER PUBLICATIONS

S. Senda and K. Hirota "Purimidine Derivatives and Related Compounds. XXII.$_1$ Synthesis and Pharmacological Properties of 7–Deazaxanthine Derivatives"; Chem. Pharm. Bull, 22(7)1459–1467(1974).

U.S. Appl. No. 09/008,542, filed Jan. 16, 1998.
U.S. Appl. No. 09/098,758, filed Jun. 17, 1998.
U.S. Appl. No. 09/368,150, filed Aug. 04, 1999.

\* cited by examiner

Primary Examiner—Peter Szekely
(74) Attorney, Agent, or Firm—Marcella M. Bodner; Paul S. Chirgott

(57) ABSTRACT

Halogen-containing polymer compositions containing a heat stabilizer comprising a latent mercaptan, a zinc salt, and a free mercaptan as a separate entity are protected during processing by the degradation products of the latent (i.e., blocked) mercaptan. A free mercaptan is among those products. The separate free mercaptan (i.e., an alien free mercaptan) enhances the activity of the latent mercaptan in a synergistic manner.

10 Claims, No Drawings

STABILIZED HALOGEN-CONTAINING POLYMER COMPOSITION

CROSS-REFERENCE TO RELATED PATENT APPLICATIONS

This is a non-provisional application of prior pending U.S. provisional application Ser. No. 60/338,433 filed Dec. 6, 2001.

This invention relates to a heat stabilized polymer composition normally susceptible to heat-induced deterioration during extrusion, injection molding and other processing of the composition at an elevated temperature. This invention also relates to articles of manufacture that are prepared from such heat-stabilized polymer compositions.

BACKGROUND OF THE INVENTION

It is well known that the physical properties of various organic polymers deteriorate and color changes take place during processing of the polymer and during exposure of formed polymer products to certain environments. Prime examples of such polymers include halogen-containing polymers, which are normally susceptible to heat-induced deterioration through autoxidation. When such polymers are processed at elevated temperatures, undesirable color changes often occur within the first 5 to 10 minutes as well as during later stages of the processing. Haziness, which sometimes accompanies the color changes, is particularly undesirable where clear products are needed. The addition of heat stabilizers to such polymers has been absolutely essential to the wide-spread utility of the polymers. Two principal classes of heat stabilizers, organotin compounds and mixed metal combinations, are known in the art. Organotin-based heat stabilizers are the most efficient and widely used stabilizers for rigid PVC. Synergistic combinations of alkyltin mercaptides and free mercaptans are taught by Kugele et al in U.S. Pat. No. 4,360,619 to be particularly efficient heat stabilizers for rigid PVC during extrusion. The oxidative stability of the mercaptans, however, is often very poor. Oxidation of the free mercaptans diminishes the synergism.

More recently, oxidatively stable latent mercaptans have been described as being unexpectedly active heat stabilizers for PVC and other halogen-containing polymers in the absence of such other compounds. The cost of the latent mercaptans is a disadvantage.

It is an object of this invention, therefore, to provide a less costly heat stabilizer composition comprising a synergistic combination of stabilizers for the protection of halogen-containing polymers during processing.

It is another object of this invention to provide a halogen-containing polymer composition containing a heat stabilizer composition having an enhanced synergism.

These and other objects and advantages of the invention that will become apparent from the following description are achieved by a composition comprising a halogen-containing polymer, a latent mercaptan having Formula 1:

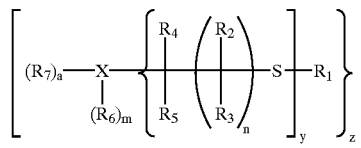

wherein a is 0 or 1, m and n are 0 or 1; y=1 to 4; when y=1, z is 1 to 4; and when y is more than 1, z is 1; $R_1$ is an alkyl, alkylenyl, cycloalkyl, cycloalkylenyl, aryl, alkaryl, aralkyl, aralkylenyl, hydroxyalkyl, dihydroxyalkyl, hydroxy (polyalkoxy)alkyl, alkoxyalkyl, hydroxyalkoxyalkyl, alkoxy(hydroxyalkyl), alkoxy(acyloxyalkyl), alkoxy (polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis(acyloxyalkyl), alkoxycarbonylalkyl, alkoxycarbonylalkylenyl, hydroxyalkoxycarbonylalkyl, hydroxy(polyalkoxy) carbonylalkyl, mercaptoalkyl, mercaptoalkylenyl, mercaptoalkoxycarbonylalkyl, mercaptoalkoxycarbonylalkylenyl, alkoxycarbonyl(amido) alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R_2, R_3, R_4, R_5, R_6$, and $R_7$ are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, aralkaryl hydroxyaryl, dihydroxyaryl, arylcycloalkyl, or a heteroatom, with the option that when a is 1 and m is 1, $R_6$ and $R_7$ form a heterocyclic moiety in conjunction with X as nitrogen, and with the further option that when a=1 and m=0, one of $R_1$, $R_3$, and $R_5$ joins with $R_7$ and X to form a heterocyclic moiety with X as a heteroatom selected from the group consisting of oxygen and sulfur; with the proviso that z is 1 or 2 when X is aralkaryl, $R_6$ and $R_7$ are hydroxyl, a is 1 and m is 1, and with the further proviso that when $R^6$ hydroxyl or mercapto, z is 1;
an alien free mercaptan; and
a zinc salt.

For the purposes of this invention, the terms "blocked mercaptan" and "latent mercaptan" are used interchangeably to mean a thioether which degrades during processing of the composition at an elevated temperature to liberate a free mercaptan. Also, an alien free mercaptan is one that is added separately from the latent mercaptan and is not a product of the degradation of the latent mercaptan during processing of the halogen-containing polymer composition of this invention.

Other products of the degradation of the latent mercaptan are believed to include carbocations of the blocking moiety, which are stabilized by a molecular structure in which several groups share the electron deficiency. Resonance stabilization and neighboring group stabilization are two of the possible mechanisms by which the carbocations may be stabilized. The carbocations act as intermediates in the formation of stable compounds early in the hot processing of halogen-containing polymers. Although such mechanisms and the resultant carbocations are believed to be an impetus for the liberation of a free mercaptan, this invention is in no way limited by the foregoing attempt to explain the working of the invention. Those skilled in the art will see the resonance stabilization and neighboring group stabilization that are possible in the following structures of the blocked mercaptan; other mechanisms may be at work in other blocked mercaptans represented by these structures that also liberate a free mercaptan upon thermal and/or chemical degradation during processing of polymeric compositions containing such blocked mercaptans. The compounds used for blocking the mercaptan group in the latent mercaptans of this invention are preferably those that are capable of furnishing a stabilized carbocation having a molecular structure in which the electron deficiency is shared by several groups. Resonance stabilization and neighboring group stabilization are two of the possible mechanisms by which the carbocations may be stabilized.

As used herein, the term halogen-containing polymer composition means a composition comprising a halogen-containing polymer in which the halogen is attached directly to a carbon atom. Poly(vinyl chloride), copolymers of vinyl chloride and vinyl acetate, and poly (vinylidene chloride) are the most familiar polymers which require stabilization for their survival during fabrication into pipe, window casings, siding, bottles, wall covering, and packaging film.

A rigid polymer composition is one that does not contain a plasticizer. A semi-rigid composition is one that contains from 1 to 25 parts of a plasticizer per 100 parts by weight of the halogen-containing polymer. A flexible composition contains from 25 to 100 parts of the plasticizer per 100 parts by weight of the halogen-containing polymer.

The hydrocarbyl radicals of Formula 1 contain from 1 to 20 carbon atoms and may have up to 3 ethylenic double bonds; likewise, the hydrocarbyl portions of hydroxyalkyl, mercaptoalkyl, and alkoxyalkyl radicals, and the like. As used herein, the term alkylenyl represents divalent, trivalent, and tetravalent straight or branched chain hydrocarbon radicals; the term oxyalkylenyl represents a divalent radical of a polyalkylene ether molecule Also, as used herein: an acyloxyalkyl radical originates from a carboxylic acid ester of an alkyl alcohol; the $R_1$ radical in Formula 1, therefore, in the stearic acid ester of mercaptopropanol is the stearoyloxypropyl radical; likewise, the $R_1$ radical of the oleic acid ester of mercaptopropanol is the oleyloxypropyl radical. On the other hand, the R1 radical of an ester of a mercaptocarboxylic acid and an alkanol is an alkoxycarbonylalkyl radical, i.e., the $R_1$ radical of lauryl-3-mercaptopropionate is dodecyloxycarbonylethyl.

The phrase "parts per hundred parts of resin is abbreviated herein as "phr". Also, as used for the purposes of this invention, substantially means largely if not wholly that which is specified but so close that the difference is insignificant.

The stabilizer compositions of this invention are particularly suited to impart both good early color and long term stabilization against the deteriorative effects of heat and ultra-violet light on both rigid and flexible PVC resins and other halogen-containing polymers in comparison with the separate use of either the latent mercaptan or alien free mercaptan equal levels of sulfur. They may be prepared by blending the components thereof in any convenient manner that produces a homogeneous mixture, such as by shaking or stirring in a container. Likewise, the stabilizer compositions of this invention can be incorporated in a halogen-containing polymer by admixing the components of the stabilizer composition and the polymer composition in an appropriate mill or mixer or by any other of the well-known methods that provide uniform distribution of the stabilizer throughout the polymer composition.

The mercaptan-containing organic compounds that may be converted into latent mercaptans for the purposes of this invention are well known compounds and include alkyl mercaptans, mercapto esters, mercapto alcohols, and mercapto acids. See, for example, U.S. Pat. Nos. 3,503,924 and 3,507,827. Alkyl mercaptans having from 1 to 200 carbon atoms and from 1 to 4 mercapto groups are suitable. Mercaptan-containing organic compounds that include $R_1$ have structures illustrated by the following formulas:

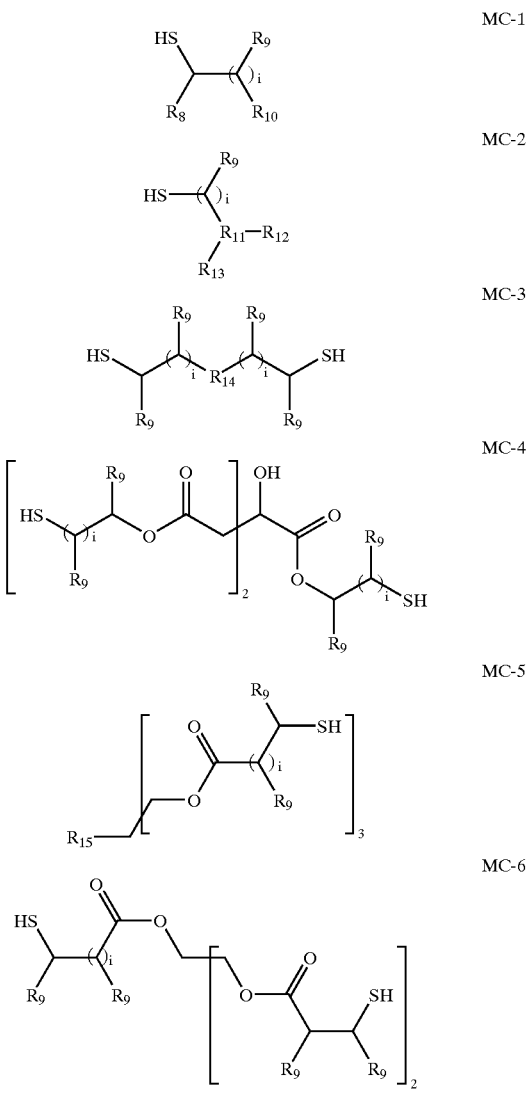

wherein $R_8$ and $R_9$ are the same or different and are $R_{16}C(=O)-O, R_{16}-OC(=O)$, —OH, —SH, aryl, $C_1$ to $C_{18}$ alkyl, or —H;

$R_9$ is —H, aryl, or $C_1$ to $C_{18}$ alkyl;

$R_{11}$ is cycloalkyl, cycloalkenyl or phenyl;

$R_{12}$ is $R_{16}C(=O)-O$, $R_{16}-OC(=O)$, —SH, aryl, $C_1$ to $C_{18}$ alkyl, —OH or —H, with the proviso that when $R_{11}$ is phenyl, $R_{12}$ is —OH and i=0 in formula (MC2), the —SH groups are on non-adjacent carbon atoms;

$R_{13}$ is —H or a divalent group which may contain halogen, hydroxy, mercapto or alkyl substituents and which when $R_{11}$ is phenyl combines with the phenyl to form a naphthal;ene ring;

$R_{14}$ is

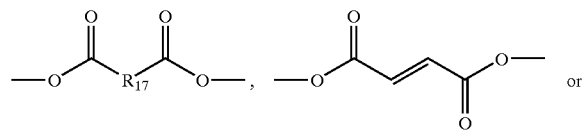

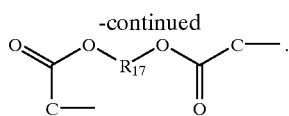

$R_{15}$ is —CH$_3$, —CH$_2$CH$_3$, or

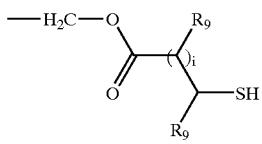

$R_{16}$ is —H, or alkyl, alkenyl, aryl, aralkyl, alkaryl, cycloalkyl, cycloalkylenyl;
$R_{17}$ is arylene, C$_1$ to C$_8$ alkylenyl,

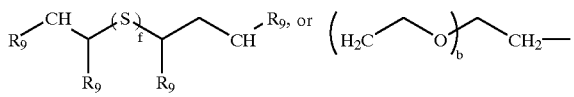

wherein b is an integer from 1 to 6;
i=0 or an integer from 1 to 6 inclusive;
j=0, 1, 2 or 3; and
f=1 or 2.

Mercaptan-containing organic compounds preferred as intermediates in the preparation of the latent mercaptans of this invention are those compounds according to formula (MC1) where $R_9$ is —H, $R_{10}$ is —H, $R_8$ is OH; $R_{16}$C(=O)O; $R_{16}$OC(=O);and i=1; those compounds according to formula (MC2) where $R_{11}$ is phenyl, $R_9$ is —H, $R_{12}$ is —H, $R_{13}$ is —H, i=1, and j=1; those compounds according to formula (MC3) where $R_9$ is —H, $R_{14}$ is —OC(=O)CH=CHC(=O)—O— and i=1; those compounds according to formula (MC4) where $R_9$ is —H and i=1; those compounds according to formula (MC5) where $R_{15}$ is —C$_2$H$_5$ or

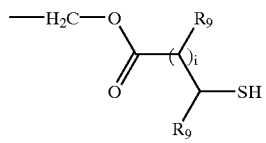

$R_9$ is —H and i=1; and those compounds according to formula (MC6) where $R_9$ is —H and i=1.

The blocking compounds are preferably those that are capable of furnishing a stabilized carbocation having a molecular structure in which several groups share the electron deficiency. Resonance stabilization and neighboring group stabilization are two of the possible mechanisms by which the carbocations may be stabilized. Polarized, unsaturated compounds exemplified by 3,4-dihydropyran, 2-methoxy-3,4-dihydropyran, styrene, "∀-methylstyrene, vinyl benzyl chloride, indene, 2-vinylpyridine, N-vinylpyrrolidone, vinyl acetate, octadecyl vinyl ether, cyclohexyl divinyl ether, ethyleneglycol monovinyl ether, allyl phenyl ether, trans-cinnamaldehyde, N-methyl-N-vinylacetamide, N-vinylcaprolactam, isoeugenol, and 2-propenylphenol are among those suitable. Other suitable compounds include 3,4-dihydro-2-methoxy-2H-pyran; 3,4-dihydro-2-ethoxy-2H-pyran; 3,4-dihydro-2-phenoxy-2H-pyran; 3,4-dihydro-2-formyl-2H-pyran; and 2,3-dihydrofuran. The 3,4-dihydro-2-formyl-2H-pyran is made by the Diels-Alder dimerization of acrolein at high temperatures and pressures. The 3,4-dihydro-2-alkoxy-2H-pyrans and 3,4-dihydro-2-phenoxy-2H-pyran are made by the reaction of the corresponding vinyl ether with acrolein in the presence of a catalytic amount of a zinc salt, e.g., zinc chloride. A variety of 3,4-dihydro-2H-pyrans having a substituent in the 2-position can be made by similar reactions. The products formed by the reaction of 1 and 2 moles of acrolein with the divinyl ether of an alkylene- or polyalkylene glycol are blocking agents, also. The latent mercaptans made from the di-(3,4-dihydropyranyl) ethers also have the potential of being chelating agents in the polymer compositions of this invention. Compounds having labile halogen atoms which split off as hydrogen chloride in a condensation reaction with the mercaptan, as exemplified by triphenylmethyl chloride, benzyl chloride, and bis(chloromethyl) benzene, are also suitable. The mercaptan may also be blocked by condensation with an aldehyde such as butyraldehyde or with a benzyl alcohol such as benzene dimethanol. The preferred blocking agents include 3,4-dihydropyran (DHP).

In general, the procedure for making latent mercaptans that are useful in this invention comprises adding the mercapto group of the free mercaptan across the double bonds of polarized, unsaturated compounds is as follows:

To a stirred mixture, under nitrogen atmosphere, of the mercaptan, acid catalyst, and optionally, a small percentage of antioxidant to inhibit radical reactions, is added dropwise to the polarized, unsaturated compound, either neat or in solution, while maintaining the temperature between 10–70° C. The mixture or solution is then heated for between 1 and 6 hours at 35–70° C. and conversion to product is monitored by gas chromatography and iodine titration for SH. The acid catalyst is removed by an alkaline wash and the resulting product is dried with magnesium sulfate and filtered. The solvent, if required, is removed under reduced pressure at <50° C. to yield the latent mercaptan. A solid phase catalyst may be used and then filtered out of the reaction mixture and regenerated for use in a subsequent synthesis. In this way, a wash step is eliminated. This generalized procedure is referred to hereinafter as Procedure A.

In accordance with Procedure A, for example, mercaptoethanol is added across the double bond of N-vinylcaprolactam to yield N-2-hydroxyethylthioethyl-caprolactam. Mercaptoethyldecanoate (mercaptoethylcaproate) reacts with 3,4-dihydropyran in that procedure to give 2-S-(tetrahydropyranyl) thioethyldecanoate. Bis(hydroxyethyl-thioethyl) cyclohexyl ether is made from the mercaptoethanol and cyclohexyl di-vinyl ether. In like manner, the corresponding caprate, oleate, and tallate esters form the corresponding cyclohexyl ethers. Also, indene is converted by the addition of the mercaptoethanol to 2H-dihydroindenylthio-ethanol. A generalized procedure for the condensation of a free mercaptan with a labile halogen-containing compound is as follows:

To a stirred mixture of the mercaptan and halogen-containing compound under nitrogen atmosphere is added dropwise a solution of sodium methoxide in methanol while maintaining the temperature below 50° C. Optionally, the reaction is allowed to proceed without the addition of a base source and the liberated hydrogen chloride is removed by nitrogen gas sweep and neutralized with the use of an external acid scrubber. The mixture or solution is then heated for between 2 to 24 hours at 50–70° C. and conversion to product is monitored by gas chromatography and iodine titration for % SH. The product is then neutralized, washed with water, dried with magnesium sulfate, and filtered. The solvent, if required, is removed under reduced pressure at <50° C. to yield the latent mercaptan. This generalized procedure is referred to hereinafter as Procedure B.

A generalized procedure for the condensation of a free mercaptan with a labile hydroxyl-containing compound is as follows:

To a stirred solution of the mercaptan, acid catalyst, and solvent under nitrogen atmosphere is added the hydroxy-containing compound either neat or in solution while maintaining the temperature <45° C. The solution is then heated to 45–75° C. for between 1 to 10 hours and conversion to product is monitored by gas chromatography and iodine titration for % SH. Optionally, an azeotropic solvent is chosen for removal of reaction water by an appropriate means at reflux temperatures, typically 60–120° C. Completion of reaction is achieved after the theory amount of water has been collected. The acid catalyst is removed by alkaline wash and the resulting solution is dried with magnesium sulfate and filtered. The solvent is removed under reduced pressure at <55° C. to yield the latent mercaptan. This procedure is referred to hereinafter as Procedure C.

For example, 2-hydroxybenzyl alcohol condenses with mercaptoethanol in accordance with Procedure C to form 1-(2-hydroxyphenyl)-1-S-(2-hydroxyethylthio) methane.

A generalized procedure for the reaction of a free mercaptan with a glycidyl ether is as follows:

To a stirred mixture of the mercaptan and acid catalyst under nitrogen atmosphere is added the glycidyl ether, either neat or in solution, while maintaining the temperature between 25–60° C. The mixture or solution is then heated to between 50–75° C. for a period of 1 to 6 hours and conversion to product is monitored by gas chromatography and iodine titration for % SH. The acid catalyst is removed by alkaline wash, the resulting product is dried with magnesium sulfate, and filtered. The solvent, if required, is removed under reduced pressure at <55° C. to yield the latent mercaptan. For example, the reaction between mercaptoethanol and glycidyl neodecanoate gives $C_9H_{19}C(=O)OCH_2CH(OH)CH_2SCH_2CH_2OH$. This procedure is referred to hereinafter as Procedure D.

A generalized procedure for the condensation of a free mercaptan with an aldehyde is as follows:

To a stirred solution of the mercaptan, acid catalyst, and azeotropic solvent under nitrogen atmosphere is added the aldehyde with heating to reflux, typically between 65–120° C., for removal of reaction water. Completion of reaction is achieved after the theoretical amount of water has been collected. Optionally, to a stirred solution of mercaptan, aldehyde, and ether is added $BF_3$-etherate dropwise under reflux conditions. The solution is refluxed for between 1 to 6 hours and conversion to product is monitored by gas chromatography. The acid catalyst is removed by alkaline wash, the solution is dried with magnesium sulfate and filtered. The solvent is removed under reduced pressure at <65° C. to yield the latent mercaptan. This generalized procedure is referred to hereinafter as Procedure E.

Examples of the blocked mercaptans of this invention include compounds having the following formulas, as each relates to FORMULA 1:

FORMULA

2.

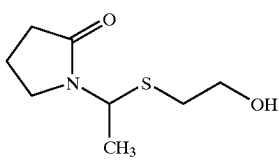

a=1, m=1, n=0; y=1, z is 1; X is nitrogen, $R_6$ and $R_7$ are joined to form $—CH_2—CH_2—CH_2—C=(O)—$; $R_4$ is hydrogen; $R_5$ is methyl; and $R_1$ is hydroxyethyl.

3.

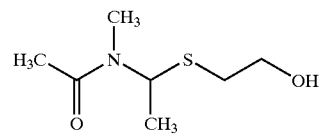

a=1, m=1, n=0; y=1, z is 1; X is nitrogen, $R_6$ is acetyl, $R_7$ is methyl, $R_5$ is methyl, $R_4$ is hydrogen, and $R_1$ is hydroxyethyl.

4.

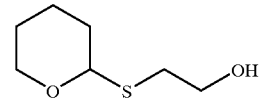

a=1, m=0, n=0; y=1, z is 1; X is oxygen, $R_5$ and $R_7$ are joined to form $—CH_2—CH_2—CH_2—CH_2—$; $R_4$ is hydrogen, and $R_1$ is hydroxyethyl.

5.

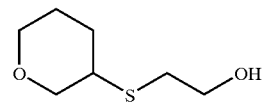

a=1, m=0, n=1, y=1, z=1; X is oxygen, $R_3$ and $R_7$ join to form $—CH_2—CH_2—CH_2—$; $R_2$, $R_3$ and $R_5$ are hydrogen, and $R_1$ is hydroxyethyl.

6.

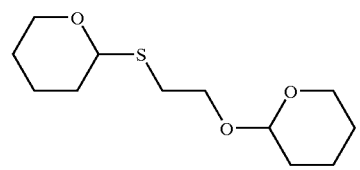

a=1, m=0, n=0, y=1, z=1; X is oxygen, $R_5$ and $R_7$ join to form $—CH_2—CH_2—CH_2—CH_2—$; $R_4$ is hydrogen, and $R_1$ is 2-tetrahydropyranyloxyethyl.

7.

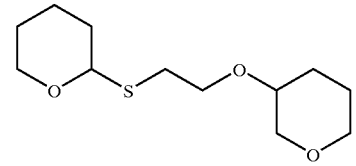

a=1, m=0, n=0, y=1, z=1; X is oxygen, $R_5$ and $R_7$ join to form $—CH_2—CH_2—CH_2—CH_2—$; $R_4$ is hydrogen, and $R_1$ is 3-tetrahydropyranyloxyethyl.

8.

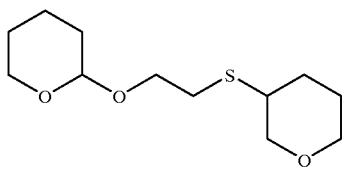

a=1, m=0, n=1, y=1, z=1; X is oxygen, $R_3$ and $R_7$ join to form —$CH_2$—$CH_2$—$CH_2$—; $R_2$, $R_4$ and $R_5$ are hydrogen, and $R_1$ is 2-tetrahydropyranyloxyethyl.

9.

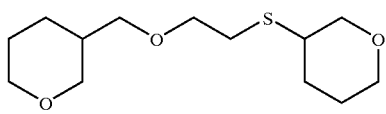

a=1, m=0, n=1, y=1, z=1; X is oxygen, $R_3$ and $R_7$ join to form —$CH_2$—$CH_2$—$CH_2$—; $R_2$, $R_4$ and $R_5$ are hydrogen, and $R_1$ is 3-tetrahydropyranyloxyethyl.

10a.

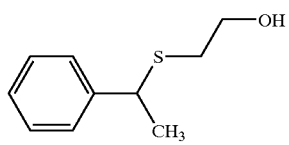

a=0, m=0, n=0, y=1, z=1; X is phenyl, $R_4$ is methyl, $R_5$ is hydrogen, and $R_1$ is hydroxyethyl.

10b.

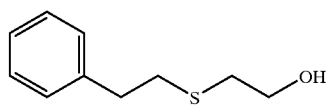

a=0, m=0, n=1, y=1, z=1, X is phenyl, $R_2$, $R_3$, $R_4$, and $R_5$ are hydrogen, and $R_1$ is hydroxyethyl.

11.

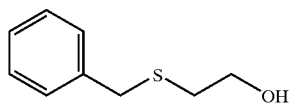

a=0, m=0, n=0, z=1; y=1, X is phenyl, $R_4$ and $R_5$ are hydrogen, and $R_1$ is hydroxyethyl.

12.

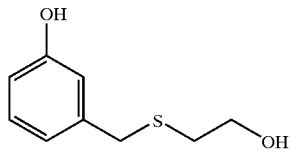

a=1, m=0, n=0, y=1, z=1; X is phenyl, $R_4$ and $R_5$ are hydrogen, $R_7$ is o-hydroxy, and $R_1$ is hydroxyethyl.

13.

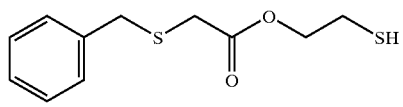

a=0, m=0, n=0, y=1, z=1; X is phenyl, $R_4$ and $R_5$ are hydrogen, and $R_1$ is mercaptoethoxycarbonylmethyl.

14.

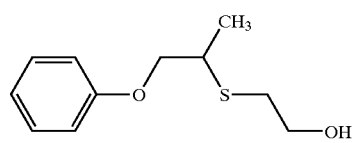

a=1, m=0, n=1, y=1, z=1; X is oxygen, $R_2$, $R_4$ and $R_5$ are hydrogen, $R_3$ is methyl, $R_7$ is phenyl, and $R_1$ is hydroxyethyl.

15.

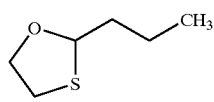

a=1, m=0, n=0, y=1, z=1; X is oxygen, $R_7$ and $R_1$ are joined to form an ethylenyl radical, $R_4$ is hydrogen, and $R_5$ is propyl.

16.

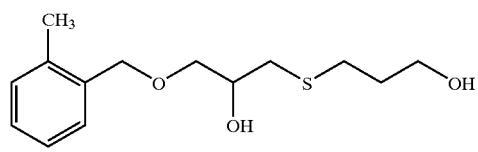

a=0, m=1, n=1, y=1, z=1; X is oxygen, $R_2$, $R_3$, $R_6$ and $R_4$ are hydrogen, $R_5$ is 2-methyleneoxytolyl, and $R_1$ is hydroxyethyl.

17.

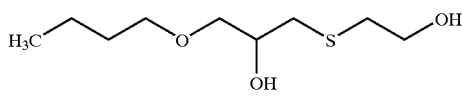

a=1, m=1, n=1, y=1, z=1; X is oxygen, $R_2$, $R_3$, $R_4$ and $R_7$ are hydrogen, $R_5$ is butoxymethyl, and $R_1$ is hydroxyethyl.

18.

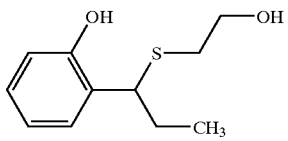

a=1, m=0, n=0, y=1, z=1; X is phenyl, $R_4$ is hydrogen, $R_5$ is ethyl, $R_7$ is o-hydroxy, and $R_1$ is hydroxyethyl.

19.

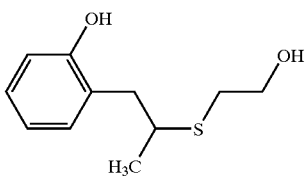

a=1, m=0, n=1, y=1, z=1; X is phenyl, $R_3$, $R_4$ and $R_5$ are hydrogen, $R^2$ is methyl, $R^7$ is o-hydroxy, and $R^1$ is hydroxyethyl.

20.

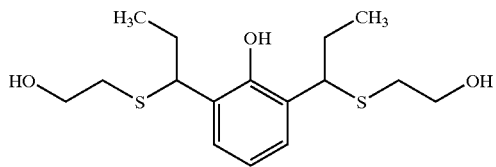

a=1, m=0, n=0, y=1, z=2; X is phenyl, $R_4$ is hydrogen, $R_5$ is ethyl, $R_7$ is o-hydroxy, and $R_1$ is hydroxyethyl.

21.

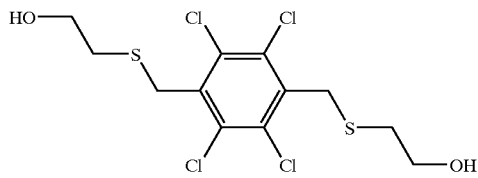

a=0, m=0, n=0, y=1, z=2; X is tetrachlorophenyl, $R_4$ and $R_5$ are hydrogen, and $R_1$ is hydroxyethyl.

22.

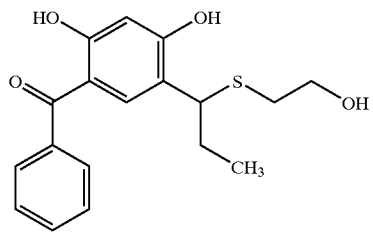

a=1, m=0, n=0, y=1, z=1; X is o,p-dihydroxyphenyl, $R_7$ is m-phenylcarbonyl, $R_4$ is hydrogen, $R_5$ is —$CH_2CH_3$, and $R_1$ is hydroxyethyl.

23.

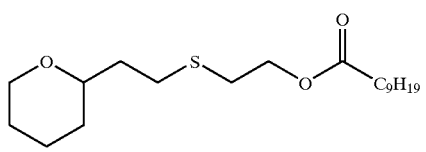

a=1, m=0, n=0; y=1, z is 1; X is oxygen, $R_5$ and $R_7$ are joined to form —$CH_2$—$CH_2$—$CH_2$—$CH_2$—; $R_4$ is hydrogen, and $R_1$ is decanoyloxyethyl.

Examples of the thus described compounds which are particularly useful in the stabilization of PVC compositions include the 2-S-(tetrahydropyranyl)thioglycolic acid esters of alkanols such as 2-ethylhexanol, octanol, and dodecanol, and the furanyl homologs thereof.

The stabilizer compositions of this invention comprise mixtures of the latent mercaptan (LM) and the alien free mercaptan (AFM) in which the alien free mercaptan constitutes from 10 to 50% or more by weight of the mixture and a zinc salt wherein the weight ratio of the LM/AFM mixture to the zinc salt is from 3 to 250. The proportion of the AFM may be higher but the performance of the stabilizer is less satisfactory. Any one or more of the mercaptan-containing compounds described hereinabove as precursors of latent mercaptans may also be used in this invention as an alien free mercaptan, as that term is defined hereinabove.

It will be readily apparent to one of ordinary skill in the art that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Thus, a suitable amount of the stabilizer composition in the halogen-containing polymer composition of this invention is that which is sufficient to supply from 0.1 to 5 phr of the LM/AFM mixture and from 0.001 to 0.3 phr by weight of zinc, measured as $zinc^{++}$ ion. A preferable level of the LM/AFM mixture in said polymer composition is from 0.1 to 4 phr. More preferably, from 0.2 to 3 phr of the LM/AFM mixture is present in said composition. Likewise, a preferred polymer composition of this invention contains from 0.002 to 0.15 phr, more preferably, from 0.005 to 0.09 phr, of zinc as the $zinc^{++}$ ion.

Zinc chloride and, preferably, zinc carboxylates are suitable for use in the stabilizer composition of this invention. The number of carbon atoms in the zinc carboxylate is from 2 to 22, preferably from 8 to 18. Examples of the carboxylic acids from which the carboxylates originate include aliphatic and aromatic acids such as acetic, propionic, butyric, n-octanoic, 2-ethylhexanoic, dodecanoic, myristic, oleic, stearic, benzoic, phenylacetic, and other aromatic acids. Zinc octanoate, zinc 2-ethylhexanoate, zinc palmitate, zinc laurate, zinc oleate, and zinc stearate are particular examples of the carboxylates that are useful in the polymer composition of this invention. Mixtures of the carboxylates are useful, also.

The stabilizer compositions of this invention are particularly suited to impart both good early color and long term stabilization against the deteriorative effects of heat and ultra-violet light on both rigid and flexible PVC resins and other halogen-containing polymers in comparison with the separate use of either the latent mercaptan or the alien free mercaptan at equal levels of sulfur. They may be prepared by blending the components thereof in any convenient manner that produces a homogeneous mixture, such as by shaking or stirring in a container. Likewise, the stabilizer compositions of this invention may be incorporated in a halogen-containing polymer composition by mixing the components thereof and the polymer in a an appropriate mill or mixer or by any other of the well known methods that provide uniform distribution of the stabilizer throughout the polymer.

From 0–30% of an epoxy compound, based on the weight of the halogen-containing polymer, may be used as a co-stabilizer in the compositions of this invention. Examples of the epoxy compounds suitable for the purposes of this invention include epoxidized vegetable oils such as soybean oil, lard oil, olive oil, linseed oil, and cottonseed oil.

Organic phosphites containing one or more, up to a total of three, aryl, alkyl, aralkyl and alkaryl groups, in any combination also are suitable as co-stabilizers for the purposes of this invention. The organic phosphites are used in an amount of from 0 to 10% on a weight basis.

The amount of the metallic-based stabilizer is from 0 to 4 phr, preferably 0.25 to 2 phr, by weight of the halogen containing resin.

For the purposes of this invention, metallic-based stabilizers are defined as being metal salts and organometallic salts other than zinc salts. The metal salts include oxides, hydroxides, sulfides, sulfates, chlorides, bromides, fluorides, iodides, phosphates, phenates, perchlorates, carboxylates, and carbonates of metals. The metals are exemplified by barium, strontium, calcium, tin, magnesium, cobalt, nickel, titanium, antimony, and aluminum. A solution of calcium dimethyl-hexanoate sold under the trademark Versalate by Shepherd Chemical Co. is also useful for the purposes of this invention.

Conventional organometallic stabilizers include the organotin carboxylates and mercaptides such as those set forth in U.S. Pat. No. 3,078,290 and U.S. Pat. No. 2,985,617. Monosulfides and/or polysulfides of the organotin mercaptides of mercaptoalkyl carboxylates and/or alkyl thioglycolates are also suitable as metal-based stabilizers in the compositions of this invention. The sulfides may be made by heating stoichiometric quantities of a mercaptoalkyl ester of a carboxylic acid or an alkyl mercaptocarboxylate and an organotin chloride having the formula $R'_{(4-z)}SnHal_z$ wherein R' is an alkyl group having from 1 to 12 carbon atoms, Hal is a halogen having an atomic weight of from 35 to 127, preferably chlorine, and z is any number from 1 to 3; in water and ammonium hydroxide to about 30° C.(86° F.), slowly adding an alkali metal mono- or polysulfide, and heating the reaction mixture further to about 45° C. before separating the product from said mixture.

It should be understood that the structures of the sulfides produced by the process mentioned above are very complex. The reactions are believed to produce an equilibrium mixture composed of several different but related products. As will be appreciated by those of ordinary skill in chemistry, equilibrium mixtures inherently include the starting materials as well as the products of any reaction between them.

In addition to the epoxy compounds and organic phosphites mentioned above, other conventional non-metallic stabilizers can also be included in the polymer compositions of the present invention. Thus, there can be included from 0 to 3 phr, by weight of a nitrogen-containing stabilizer such as dicyandiamide, hindered amines melamine, urea, the 1,3-dialkyl-6-amino-uracil derivatives described in German Offenlegungsschrift 19,741,778 by Ciba Specialty Chemicals Holding Inc. The uracils may be prepared by the method described by S. Senda and K. Hirota in Chem. Pharm. Bull., 22(7), 1459–1467 (1974) or by the reaction of the corresponding aminouracil with molar excesses of chloroacetaldehyde and ammonium acetate in water at about 65° C. until a precipitate forms or with molar excesses of acetoxyacetone and ammonium acetate in water at reflux for 12 hours. The pyrrolodiazine diones described in published Australian Patent Application No. AU-A-48232/96 by Ciba-Geigy, and the like may also be used in this invention as a co-stabilizer.

Likewise a polyol stabilizer can be used in an amount of from 0–2 phr by weight of the halogen-containing polymer.

Such a stabilizer is exemplified by glycerol, sorbitol, pentaerythritol, poly(vinyl alcohol), glyceryl mono-oleate, glyceryl mono-acetate, and glyceryl monostearate.

In addition to the stabilizer compositions of this invention, the halogen-containing polymer compositions of this invention may contain plasticizers and conventional additives such as pigments, fillers, blowing agents, dyes, ultraviolet light absorbing agents, antioxidants, densifying agents, biocides, and lubricants.

The following examples further illustrate the preparation of blocked mercaptans of this invention, the preparation of stabilizer compositions of this invention, and the advantages of said blocked mercaptans and stabilizer compositions.

The Preparation of Blocked Mercaptans

REFERENCE EXAMPLE 1

H-NMR spectroscopy was used to determine the molecular structure of 2-S-(decanoyloxyethylthio) tetrahydropyran or 2-S-(tetrahydropyranyl)thioethylcaprate which was prepared by adding 42.0 grams (0.50 mole) of 3,4-dihydropyran to 112.2 grams (0.50 equivalent) of mercaptoethylcaprate (14.7% SH) in the presence of an acid catalyst over a period of 45 minutes while maintaining a nitrogen atmosphere and a temperature below 35° C. and then heating it to 50° C. and holding that temperature for 1.5 hours. After cooling the solution, it was washed with two 200 ml portions of a 10% sodium bicarbonate solution in water, followed by a 200 ml wash with water. The organic layer was dried with MgSO4 to yield a light yellow liquid having an SH content of less than 0.5% as determined by titration with a 0.100 N iodine solution in isopropanol. The $^1$H-NMR (CDCl$_3$,*) spectrum was: 2.3 (2H, t, —C(=O)—C$\underline{H}_2$—CH$_2$), 2.8 (2H, m, —S—C$\underline{H}_2$—CH$_2$—), 4.2 (2H, m, —S—CH$_2$C$\underline{H}_2$—O—), 4.9 (1H, m, —O—C$\underline{H}$(—S—CH$_2$—)—CH$_2$—CH$_2$—).

REFERENCE EXAMPLE 2

2-S-(tetrahydropyranyl)-(2-ethylhexyl)thioglycolate is prepared by adding 172.45 grams (2.05 equiv.) of 3,4-dihydro(2H)pyran dropwise to 472 grams (2.00 equiv.) of 2-ethylhexylthioglycolate containing 0.9 gram of methanesulfonic acid (70% active) over a period of 45 minutes under a nitrogen blanket and a temperature between 25–35° C. and heating to 35–40° C. for 2 hours. The reaction mixture is cooled before being vacuum filtered through carbon black to yield the desired product.

The Preparation of Stabilizer Compositions of this Invention

EXAMPLES 1–3 AND COMPARATIVE EXAMPLES A AND B

Rigid PVC compositions containing:

| COMPONENT | AMOUNT |
| --- | --- |
| PVC resin (Shintech SE 950) | 100.0 |
| Calcium carbonate | 5.0 |
| TiO$_2$ | 1.0 |
| XL-165 | 1.2 |
| Calcium stearate | 0.6 |
| Oxidized polyethylene | 0.15 |
| Zinc octanoate | 0.08 | and the amounts of the latent mercaptan of Reference Example 2 (LM) and 2-ethylhexylthioglycolate (an AFM), indicated in Table I were processed on a Collin mill (a standard horizontal two-roll mill) at roll speeds of 30F/40R at 390EF with chips taken at one minute intervals to a maximum of 10 minutes. Said amounts gave equal levels of sulfur (0.11 phr). The color properties of the chips were measured against a white tile standard using a Hunter Labs Colorimeter and both the yellowness index (YI) and the whiteness index (WI) were selected for comparison in Tables II and III.

TABLE I

| Example | Amount of LM (phr) | Amount of AFM (phr) |
|---|---|---|
| A | 1.0 | 0.0 |
| 1 | 0.75 | 0.18 |
| 2 | 0.5 | 0.35 |
| 3 | 0.25 | 0.53 |
| B | 0.0 | 0.71 |

TABLE II

| Time (min) | Example | | | | |
|---|---|---|---|---|---|
| | A | 1 | 2 | 3 | B |
| | Yellowness Index | | | | |
| 1 | 9.7 | 3.4 | 2.9 | 2.8 | 3.0 |
| 2 | 21.3 | 4.7 | 4.1 | 4.0 | 4.0 |
| 3 | 23.8 | 6.9 | 6.4 | 6.0 | 6.3 |
| 4 | 22.6 | 8.9 | 8.7 | 9.0 | 9.3 |
| 5 | 20.2 | 11.8 | 12.5 | 13.2 | 13.8 |
| 6 | 19.4 | 14.7 | 16.0 | 16.3 | 17.0 |
| 7 | 20.1 | 16.1 | 17.4 | 19.0 | 23.8 |
| 8 | 20.2 | 17.9 | 20.6 | 23.3 | 27.4 |
| 9 | 20.2 | 20.5 | 25.4 | — | — |
| 10 | 21.6 | 23.5 | — | — | — |

TABLE III

| Time (min) | Example | | | | |
|---|---|---|---|---|---|
| | A | 1 | 2 | 3 | B |
| | Whiteness Index | | | | |
| 1 | 46.9 | 65.4 | 66.7 | 67.8 | 67.8 |
| 2 | 19.7 | 61.1 | 63.0 | 64.7 | 64.7 |
| 3 | 13.9 | 54.5 | 56.4 | 58.3 | 58.1 |
| 4 | 15.3 | 49.8 | 49.9 | 49.7 | 49.3 |
| 5 | 20.2 | 41.4 | 39.4 | 38.7 | 37.0 |
| 6 | 21.5 | 33.6 | 30.3 | 30.1 | 29.3 |
| 7 | 19.7 | 30.8 | 26.9 | 23.5 | 10.1 |
| 8 | 19.2 | 26.0 | 17.0 | 11.0 | −0.5 |
| 9 | 19.0 | 166.7 | 4.9 | — | — |
| 10 | 16.3 | 7.9 | — | — | — |

EXAMPLE 4 AND CONTROLS

Eighty gram samples of rigid PVC compositions containing the following components in the proportions indicated:

| COMPONENT | AMOUNT |
|---|---|
| PVC resin (Shell 6704) | 100.0 |
| Calcium carbonate | 2.0 |
| TiO$_2$ | 0.2 |
| Calcium stearate | 0.4 |
| XL-165 | 1.1 |

-continued

| COMPONENT | AMOUNT |
|---|---|
| Oxidized polyethylene | 0.15 |
| Stearic acid | 0.05 | and the amounts of the latent mercaptan of Reference Example 2 (LM), 2-ethylhexylthioglycolate (an AFM), and zinc octanoate indicated in Table IV were processed in a Brabender Plasticorder PL2000/PL2100 mixer at 374° F. (190° C.) and a mixer speed of 60 rpm with chips taken at one minute intervals to a maximum of 6 minutes. Said amounts gave equal levels of sulfur (0.11 phr). The color properties of the chips were measured against a white tile standard using a Hunter Labs Colorimeter and the dE values were selected for comparison in Table V.

TABLE IV

| Example | LM (phr) | AFM (phr) | Zinc octanoate (phr) as zinc$^{++}$ ion |
|---|---|---|---|
| Control 1 | 1.0 | 0.0 | 0 |
| Control 2 | 0.85 | 0.1 | 0 |
| Control 3 | 0.65 | 0.25 | 0 |
| Control 4 | 0.0 | 0.71 | 0 |
| 4 | 0.85 | 0.1 | 0.022 |

TABLE V

| Time (min) | Example | | | | |
|---|---|---|---|---|---|
| | Control 1 | Control 2 | Control 3 | Control 4 | 4 |
| | dE | | | | |
| 1 | 36.5 | 30.1 | 31.0 | 24.2 | 16.8 |
| 2 | 55.2 | 50.0 | 48.4 | 38.0 | 18.0 |
| 3 | 60.8 | 61.1 | 60.6 | 50.1 | 18.2 |
| 4 | 65.0 | 65.4 | 63.2 | 57.7 | 19.8 |
| 5 | 61.0 | 62.6 | 64.2 | 61.2 | 23.1 |
| 6 | — | — | — | — | 42.2 |

Articles of manufacture contemplated by this invention, e.g. packaging film, tubing, rigid pipe, and window profile, are formed from the stabilized compositions of this invention by any of the well-known conventional techniques for forming polymers into shaped articles.

The subject matter claimed is:

1. A polymer composition normally susceptible to heat-induced decomposition comprising: a halogen-containing polymer, a latent mercaptan having the structure:

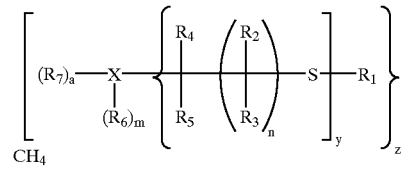

wherein a is 0 or 1, m and n are 0 or 1; y=1 to 4; when y=1, z is 1 to 4; and when y is more than 1, z is 1; $R_1$ is an alkyl, alkylenyl, cycloalkyl, cycloalkylenyl, aryl, alkaryl, aralkyl, aralkylenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy) carbonylalkyl, mercaptoalkyl, mercaptoalkylenyl, mercaptoalkoxycarbonylalkyl, mercaptoalkoxycarbonylalkylenyl, alkoxycarbonyl(amido)alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R_2, R_3, R_4, R_5, R_6$, and $R_7$ are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, aralkaryl, hydroxyaryl, dihydroxyaryl, arylcycloalkyl, or a heteroatom, with the option that when a is 1 and m is 1, $R_6$ and $R_7$ form a heterocyclic moiety in conjunction with X as nitrogen, and with the further option that when a=1 and m=0, one of $R_1$, $R_3$, and $R_5$ joins with $R_7$ and X to form a heterocyclic moiety with X as a heteroatom selected from the group consisting of oxygen and sulfur; with the proviso that z is 1 or 2 when X is aralkaryl, $R_6$ and $R_7$ are hydroxyl, a is 1 and m is 1, and with the further proviso that when $R_6$ hydroxyl or mercapto, z is 1;

an alien free mercaptan; and a zinc salt.

2. The composition of claim 1 wherein the amount of the blocked mercaptan/alien free mercaptan mixture is from 0.1 to 5 phr by weight of the halogen-containing polymer.

3. The composition of claim 1 wherein the amount of the blocked mercaptan/alien free mercaptan mixture is from 0.2 to 3 phr by weight of the halogen-containing polymer.

4. The composition of claim 1 wherein the amount of the zinc salt is from 0.001 to 0.3 phr by weight of the halogen-containing polymer, measured as zinc$^{++}$ ion.

5. The composition of claim 4 wherein the amount of the zinc salt is from 0.005 to 0.09 phr by weight of the halogen-containing polymer.

6. The composition of claim 1 wherein the zinc salt is a zinc carboxylate.

7. The composition of claim 1 wherein $R_1$ is alkoxycarbonylalkyl.

8. The composition claim 1 wherein a=1 and m=0, one of $R_1, R_3,$ and $R_5$ is joined with $R_7$ and X to form a heterocyclic moiety with X as oxygen.

9. The composition of claim 8 wherein $R_1$ is alkoxycarbonylalkyl.

10. A stabilizer composition comprising a latent mercaptan having the structure:

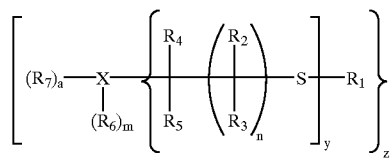

wherein a is 0 or 1, m and n are 0 or 1; y=1 to 4; when y=1, z is 1 to 4; and when y is more than 1, z is 1; $R_1$ is an alkyl, alkylenyl, cycloalkyl, cycloalkylenyl, aryl, alkaryl, aralkyl, aralkylenyl, hydroxyalkyl, dihydroxyalkyl, hydroxy (polyalkoxy)alkyl, alkoxyalkyl, hydroxyalkoxyalkyl, alkoxy(hydroxyalkyl), alkoxy(acyloxyalkyl), alkoxy (polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy) carbonylalkyl, mercaptoalkyl, mercaptoalkylenyl, mercaptoalkoxycarbonylalkyl, mercaptoalkoxycarbonylalkylenyl, alkoxycarbonyl(amido)alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R_2, R_3, R_4, R_5, R_6$, and $R_7$ are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, hydroxyaryl, dihydroxyaryl, alkoxyaryl, arylcycloalkyl, or a heteroatom, with the option that when a is 1 and m is 1, $R_6$ and $R_7$ form a heterocyclic moiety in conjunction with X as nitrogen, and with the further option that when a=1 and m=0, one of $R_1$, $R_3$, and $R_5$ joins with $R_7$ and X to form a heterocyclic moiety with X as a heteroatom selected from the group consisting of oxygen and sulfur; with the proviso that z is 1 or 2 when X is aralkaryl, $R_6$ and $R_7$ are hydroxyl, a is 1 and m is 1, and with the further proviso that when $R^6$ hydroxyl or mercapto, z is 1;

an alien free mercaptan constituting from 10 to 50% by weight of the mixture of the latent mercaptan and alien free mercaptan; and a zinc salt, wherein the weight ratio of the latent mercaptan/alien free mercaptan mixture to the zinc salt is from 3 to 250.

* * * * *